United States Patent

Cogar et al.

[15] 3,666,152

[45] May 30, 1972

[54] TAPE HANDLING APPARATUS FOR DATA RECORDER

[72] Inventors: George R. Cogar, Frankfort; Torkjell Sekse, Marcy; Walter Banziger; Joseph W. Ming, both of Utica; Laszlo Horvath, Ilion, all of N.Y.

[73] Assignee: Mohawk Data Sciences Corporation, Herkimer, N.Y.

[22] Filed: May 5, 1970

[21] Appl. No.: 46,570

Related U.S. Application Data

[62] Division of Ser. No. 786,526, Nov. 18, 1968, Pat. No. 3,578,257, which is a division of Ser. No. 541,450, Mar. 30, 1966, Pat. No. 3,483,523.

[52] U.S. Cl. ....................226/50, 226/115

[51] Int. Cl. ....................B65h 17/20

[58] Field of Search ....................226/49, 50, 51, 33, 108, 115

[56] References Cited

UNITED STATES PATENTS

| | | | |
|---|---|---|---|
| 2,954,911 | 10/1960 | Baumeister | 226/95 |
| 3,091,380 | 5/1963 | Harris | 226/50 |

*Primary Examiner*—Richard A. Schacher

*Attorney*—Francis J. Thomas, Richard H. Smith, Thomas C. Siekman and Sughrue, Rothwell, Mion, Zinn & Macpeak

[57] ABSTRACT

A tape handling apparatus for a machine which records data on magnetic tape wherein the tape is advanced by a drive capstan rotated by a driving belt which also drives a mechanism for backspacing the tape. To advance the tape a pinch roller is moved to engage the tape between itself and the drive capstan. To backspace the tape, clutch means drivingly connects the backspace mechanism with the driving belt.

4 Claims, 9 Drawing Figures

GEORGE R. COGAR
TORKJELL SEKSE
WALTER BANZIGER
JOSEPH W. MING
LASZLO HORVATH
INVENTORS.

Attorneys

TAPE HANDLING APPARATUS FOR DATA RECORDER

This is a division of Application Ser. No. 786,526, filed Nov. 18, 1968, now issued as U.S. Pat. No. 3,578,257 for TAPE HANDLING APPARATUS FOR DATA RECORDER, Ser. No. 786,526 is itself a division of Application Ser. No. 541,450 filed Mar. 30, 1966, now U.S. Pat. No. 3,483,523 for DATA RECORDING AND VERIFYING MACHINE.

This invention relates generally to computing apparatus, and has particular reference to a novel data recording machine in which a series of characters keyed into the machine is subsequently recorded on magnetic tape or compared against a series of characters previously read from magnetic tape.

Electronic computer systems can operate most efficiently when the information to be processed is available on magnetic tape. Prior to the development of the machine of the invention, two machines — a card punch and a key verifier — have usually been used to record information in computer systems. In the data recorder to be disclosed herein business and scientific data can be manually recorded and verified on magnetic tape without the need for any intermediate medium.

Very briefly, the data recorder of the invention includes a keyboard which permits entry of 63 different character codes, including alphabet, numerics and special characters. The output media is in the form of a seven channel magnetic tape, and up to 80 data characters can be recorded in each unit record. A magnetic core memory is used to store data to be recorded in a unit record during a recording run, and also to store program patterns. In the entry mode, keyed data is entered into memory until the machine is signalled that the data record is complete. The data is then read (but not erased) from memory and written on the tape after which the tape is backspaced the length of the record just written and the record is read from the tape and compared with the data as it is in memory. In the verify mode, a unit record of data is entered into memory from the tape being verified. The verify operator then transcribes data from the source media and as each character is entered it is compared with the information in memory. Any difference is signalled to the operator.

It is very important in a system of this type that a semiskilled operator be capable of easily learning the operation of the machine and of operating it day in and day out reliably with a minimum amount of supervision. It is further necessary that the machine be as inexpensive to manufacture as possible.

It is therefore an object of the present invention to provide for a data recorder an improved, low cost, reliable, easy to operate tape handling system with a simplified tape path arrangement for efficient tape handling.

Other objects and advantages of the data recording machine of the invention will become apparent from the following detailed description thereof, read in conjunction with the accompanying drawings which disclose the principles of the invention and a preferred means for carrying them out.

Figure 1:
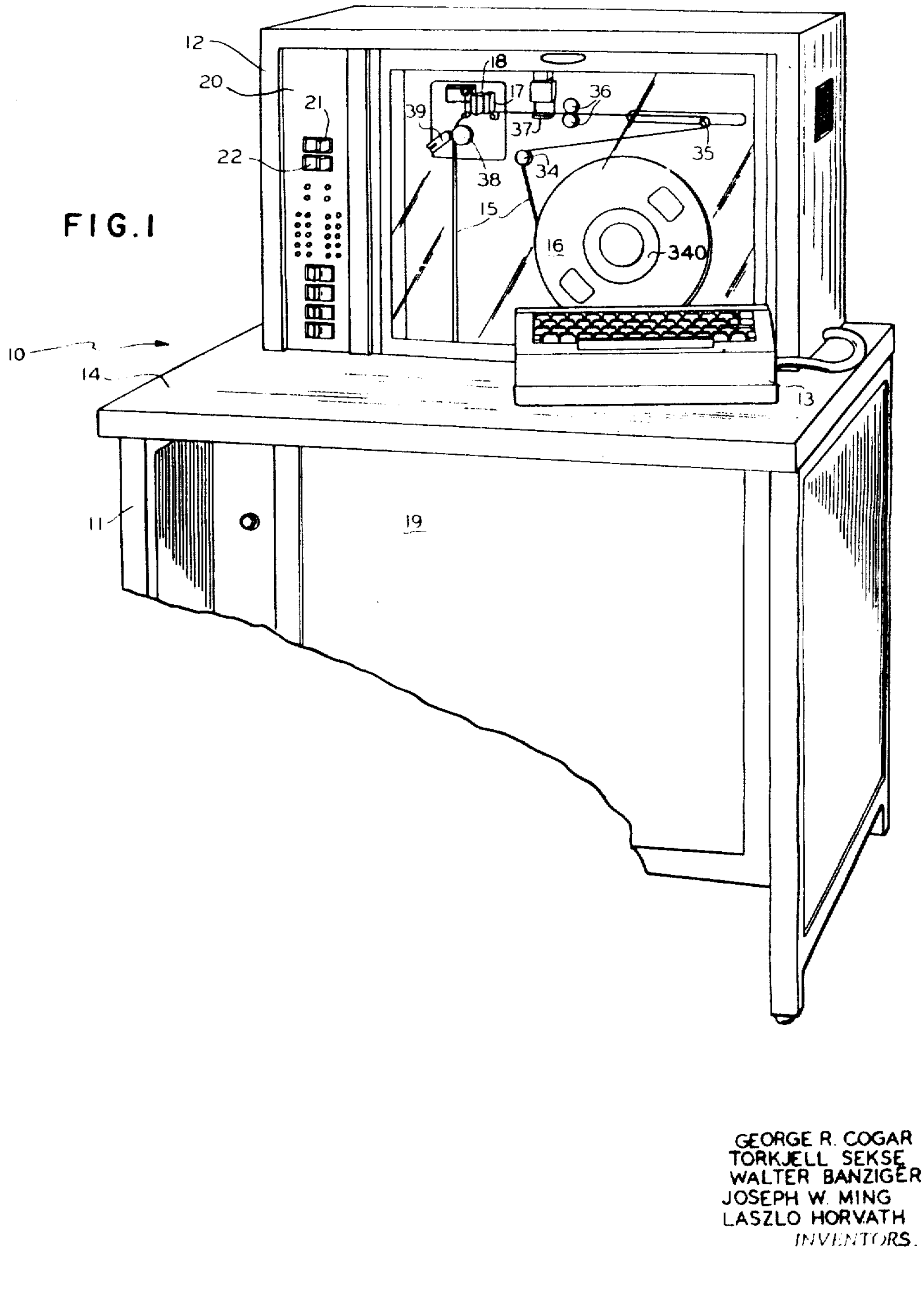
FIG. 1 is a fragmentary front perspective view of a data recording machine embodying the invention.

As already noted, the data recorder of the invention is characterized by its ability to record information on tape and verify information from tape. The machine is generally indicated by the reference number 10 in FIG. 1 and includes a lower deck portion 11, and a tape cabinet 12 mounted thereon. The desk portion is arranged so that the operator can sit in front of the machine comfortably and operate the keyboard 13 which is contained in a movable unit for operator comfort. The keyboard unit is supported as shown on the desk top 14 which also has ample room for the source media.

In the entry mode of the machine, data which has been entered into memory from the keyboard is thereafter read from memory and written on tape which is shown at 15 in FIG. 1, the tape being supplied from a reel 16 mounted in the tape cabinet 12.

The tape 15 used in the machine is seven channel magnetic computer tape and the supply reels 16 are of a standard type. In each frame on the tape, six of the channels will reflect the six DCD code data bits for the character being recorded while the seventh channel will show a parity bit, the recording being done in either even or odd parity. The recording is at a density of 200 bits per inch with fixed length data blocks, or data records, of 80 data characters plus a longitudinal parity character. These records are separated by an inter-record gap of a nominal 0.75 inch. The tape path, FIG. 1, leads past an erase head 17, a read-record head 18 and from thence into a storage bin not shown in FIG. 1, but located in an enclosed portion 19 of the desk 11 beneath the tape cabinet.

The tape 15 extends from reel 16, FIG. 1, around a guide roller 34, a second guide roller 35 mounted on a tension arm and then between the rollers 36 of a backspace mechanism. From the backspace mechanism, the tape passes through a pressure pad mechanism 37, under the crane head 17 and read-record head 18, and then between drive capstan 38 and pinch roll 39, the mechanical operation of these components to be described hereinafter. Forward movement of the tape is effected by moving the pinch roll 39 into engagement with the rotating capstan which causes the tape to be accelerated to a nominal velocity of 31 inch per second. At the completion of a recording run, the tape is rewound on the supply reel 16 by setting the pressure pad mechanism 37 to REWIND, turning the power switch 21 to OFF and the rewind switch 22 to ON. When the tape has been completely rewound on the supply reel, the rewind switch must be manually turned to the OFF position.

In the entry mode, the tape is moved in the forward direction and passes under the erase head 17 before passing under the read-record head 18. The erase head operates to completely erase the tape and thereby prevent low level noise which might occur due to variations in track widths or to track misalignment. In the verify mode, on the other hand, no erasure occurs during forward movement of the tape. The tape can be manually backspaced by depressing the tape backspace key which causes the backspace rollers 36 to move the tape backward a nominal 1.125 inch.

Figure 2:
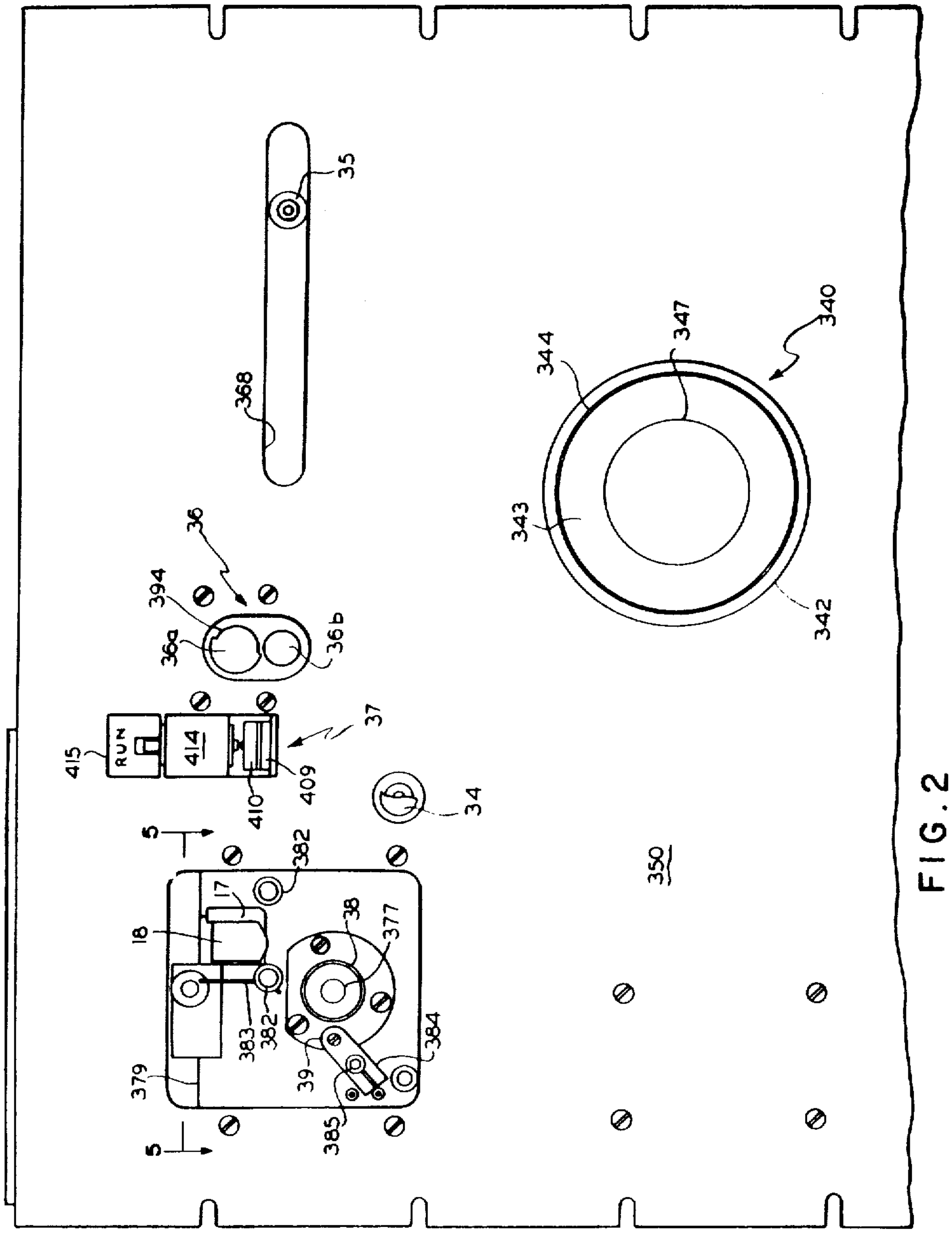
FIG. 2 is a front elevation of the tape deck wall and components mounted thereon.
Figures 4, 7:
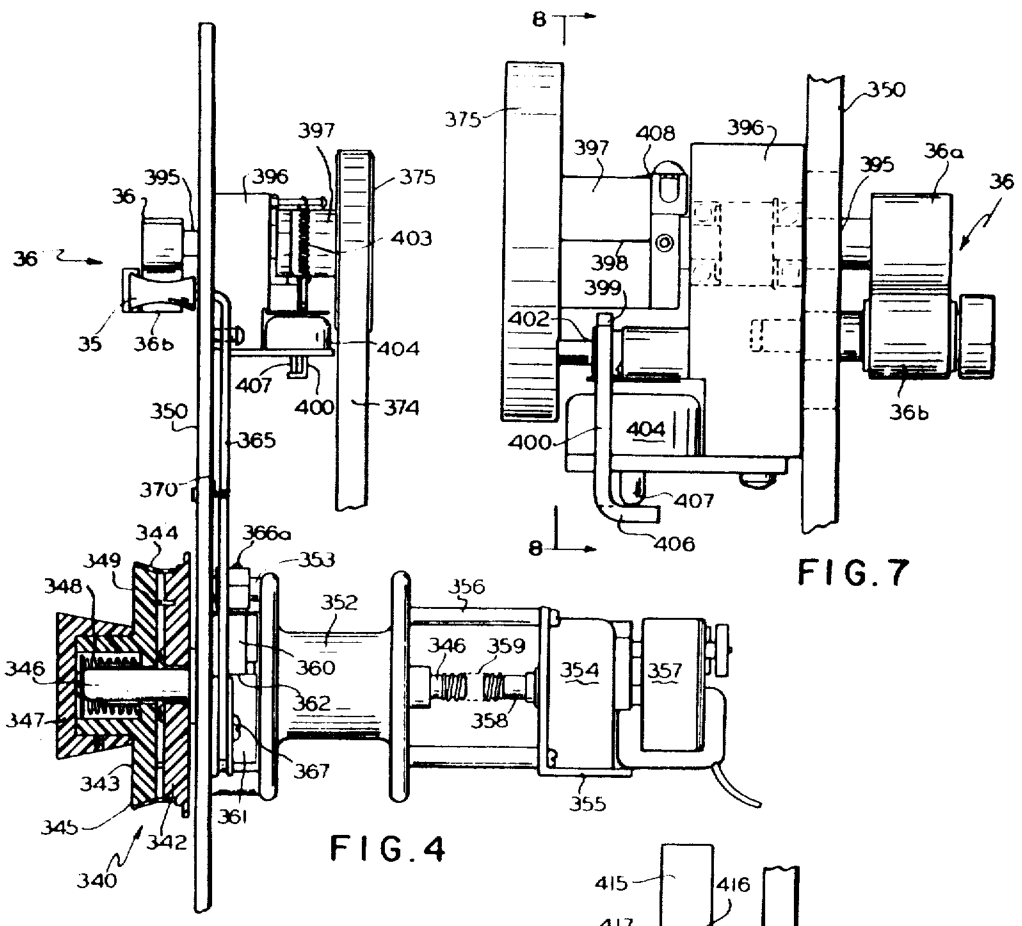
FIG. 4 is an end elevation, partly in section, of the tape deck wall looking from the left in FIG. 3, the part in section being taken substantially along line 4—4 of FIG. 3.
FIG. 7 is a side elevation of the backspace mechanism subassembly as viewed from the direction of line 7—7 in FIG. 3.

The tape reel is removably mounted on a circular holder 340, FIGS. 1, 2 and 4. As may be seen in FIG. 4, where the reel itself is not shown, the holder is comprised of a backing plate 342, a locking plate 343 and a band 344 of resilient material such as rubber which engages the edges of the two plates as shown. The edge of the locking plate tapers outwardly and at its point 345 of maximum diameter, with the band 344 encircling it, it is slightly larger than the center opening of a standard reel. The locking plate is movable axially on shaft 346 and when it is pulled outwardly by means of knob 347, compressing an interior spring 348, its outer edge 345 moves away from the outer edge of the band 344 so that the latter can contract to an overall diameter that is slightly less than that of the plate outer edge. This enables the tape reel to be slipped past the plate edge 345 and onto the holder where it will be held in place by permitting the locking plate to return to its inner position shown in FIG. 4.

Locking plate 343 is provided with pins 349 which are normally received with a free fit in corresponding holes in backing plate 342. The length of these pins is such that when the locking plate is pulled out to mount or demount a reel, the pins are completely withdrawn from the holes and the plate can be turned slightly to move the holes and pins out of registry whereby the pins hold the plate in the outer position.

The shaft 346 turns freely with the reel holder when the tape is being drawn off the reel and operates as a drive shaft when rewinding. The shaft extends through the tape deck wall 350; and on the back side thereof it is supported by a bearing housing 352 that is secured in spaced relation to the wall by a plurality of posts 353. A motor 354 for rewinding the tape is mounted on a bracket 355, the bracket being connected to the bearing housing by stand-off posts 356. The motor is provided with a clutch 357 and its shaft 358 is connected to shaft 346 by a torque converter spring 359.

A brake drum 360 is fixed on shaft 346 just behind the wall 350 and a brake band 361, having looped end 362 mounted on one of the posts 353, passes partially around the drum. The free end 363 of the band is connected through a tension spring 364, FIG. 3, to the tension arm 365. A spring finger 366, supported by a bracket 366a mounted on a post 353, bears against the free end of the brake band as shown so that the band maintains engagement with the brake drum even when the upper end of the tension arm moves toward the right as viewed in FIG. 3. The tension arm is pivotally connected to the tape deck wall at 367 and its upper end extends through a slot 368 in the wall and carries the tape guide roller 35. As best shown in FIG. 4, roller 35 has an hour glass configuration whereby the tape is self-centering with respect to it.

Figure 3:
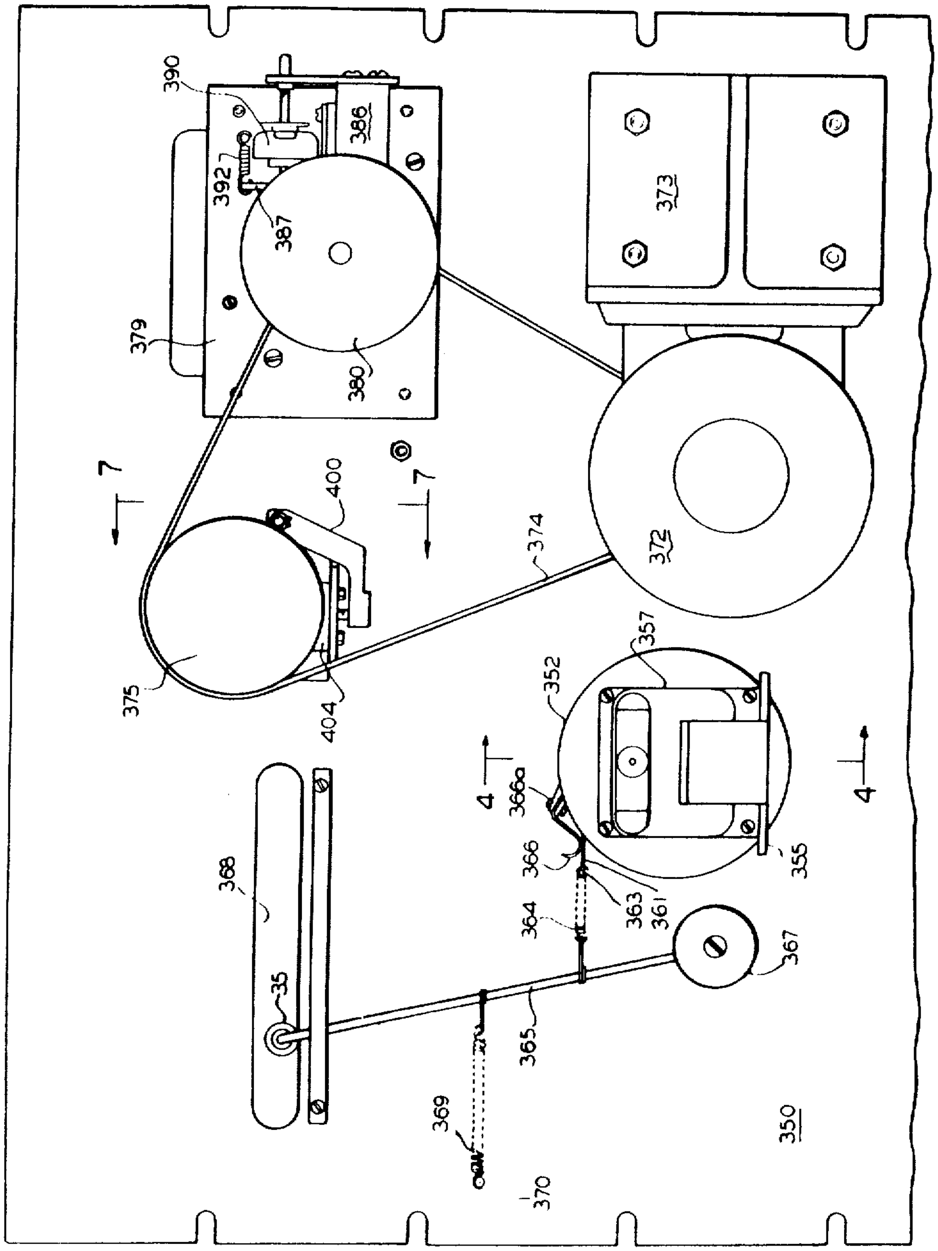
FIG. 3 is a rear elevation of the tape deck wall.

A second tension spring 369 extends from the tension arm to a post 370 and biases the upper end of the arm toward the left as viewed in FIG. 3. This cooperates with the brake band 361 to keep the proper amount of tension on the tape at all times as it is being drawn off the reel. Thus, if the pull on the tape at capstan 38 starts to become excessive, this will cause roller 35 to move toward the right (FIG. 3) thereby slackening the pull on the brake band so that the tape reel will turn more easily. Conversely, if the pull on the tape is relatively light, spring 369 will have more effect and will cause roller 35 to move toward the left; this tightens the brake band on the brake drum so that the tape reel turns less easily.

The tape is unwound or drawn from the reel by moving the pinch roll 39 into engagement with the rotating capstan 38 with the tape positioned therebetween. The capstan rotates continuously while the machine is on, and it is driven by a motor 372 mounted on the back of the tape deck wall 350 by means of a bracket 373, FIG. 3. The motor shaft carries a pulley (not shown) that drives a timing belt 374 and the latter drives a back-space mechanism pulley 375 and a capstan pulley 376, see FIG. 5. The capstan pulley is fixed on a shaft 377 that is journalled in a bearing block 378 forming a part of the capstan sub-assembly shown in FIG. 5.

The block 378 is carried by a head plate 379 that is mounted in an opening in the tape deck wall 350, FIGS. 2 and 3, and shaft 377 carries capstan 38 on the front side of the head plate. Behind pulley 376, shaft 377 carries a flywheel 380 which is provided to dampen any motor jitter there might be. The flywheel also enables immediate response to the pinch roll action because its weight evens out the load.

Figure 5:
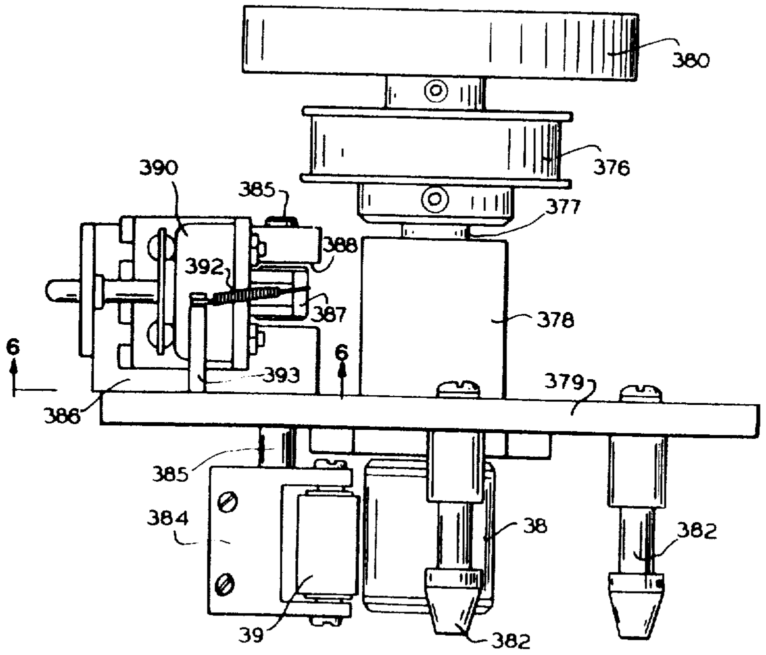
FIG. 5 is a top plan view of the capstan sub-assembly.

Above the capstan, as shown in FIGS. 2 and 5, are two fixed tape guides 382 which hold the tape in engagement with the erase and read-record heads 17, 18. A spring steel finger 383 bears against the left hand guide to minimize the possibility of having a tape loop form between the read-record head and capstan. This finger can be moved out of engagement with the guide when threading the tape.

Figure 6:
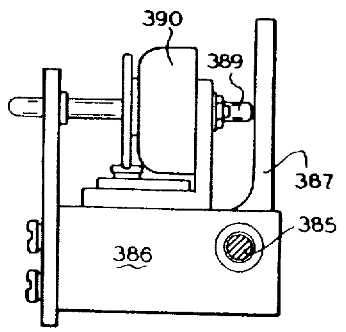
FIG. 6 is a vertical section through the capstan sub-assembly taken substantially along line 6—6 of FIG. 5.

The pinch roll 39 is rotatably mounted in a holder 384 that is fixed on a rocker shaft 385, the shaft passing through the head plate 379 and being journalled in a bearing block 386 mounted on the back of the plate. An upstanding rocker arm 387, FIGS. 5 and 6, is fixed on the rocker shaft in a bifurcated portion 388 of the bearing block, and this arm is engaged by the plunger 389 of a commercially available actuator 390 such as a Ledex actuator, a linear solenoid. A spring 392 extending from the top of arm 387 to a post 393 holds the pinch roll out of engagement with the capstan when forward movement of the tape is not called for. When forward movement is called for, a signal is received by the actuator which causes its plunger 389 to rock arm 387 in a clockwise direction (as viewed in FIG. 6) and press the pinch roll into engagement with the capstan.

Figure 8:
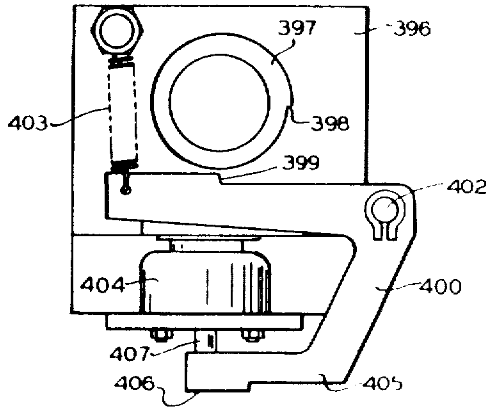
FIG. 8 is a rear elevation of the backspace mechanism with the backspace pulley removed.

The backspace rollers 36, FIGS. 2 and 7, are arranged to move the tape backward a distance of 1.125 inch upon receipt of a signal, as previously described. To this end, the upper, drive roller 36a which is made of steel has a relieved area 304 whereby only 191° of the roller's surface can engage the tape. The lower roller 36b is made of urethane and is simply a follower. Roller 36a is fixed on a shaft 395 that is journalled in a bearing block 396 mounted on the back of the tape deck wall. The shaft extends back from the bearing block and into a spiral cam 397, FIGS. 7 and 8, forming a part of a commercially available wrap spring clutch. This clutch is operably connected on its opposite side to the backspace pulley 375 driven by motor 372, FIG. 3.

Pulley 375 turns continuously as described above, and can be made to drive shaft 385 through a conventional wrap spring (not shown). However, the wrap spring is normally prevented from driving the shaft by cam 397 which is connected to one end of the spring. This is accomplished by preventing rotation of the cam through engagement of its shoulder 398 with a shoulder 399 on a rocker arm 400, FIG. 8. The rocker arm, which is pivotally connected to the bearing block at 402, is normally biased into engagement with the cam shoulder by a spring 403.

The rocker arm can be moved out of engagement with the cam shoulder by a counter clockwise rotation of the arm, this being effected by a solenoid actuator 404 such as actuator 390 described above. To this end, the arm has a lower extension 405 provided with a horizontal flange 406 that underlies the actuator plunger 407. When the backspace signal is received by the actuator, its plunger moves downward just long enough to rock the rocker arm and permit cam 397 to be rotated by means of the wrap spring clutch.

Since the plunger is retracted almost immediately, the rocker arm is rotated in the opposite direction by spring 403 and its shoulder is in position to stop the cam after one complete revolution thereof. The roller 36a, therefore, also makes one complete revolution with its non-relieved surface portion engaging the tape long enough to backspace it the required distance. A tab limit stop device 408 is operably connected to an end of the wrap spring and coacts with the clutch mechanism in a well-known manner.

Figure 9:
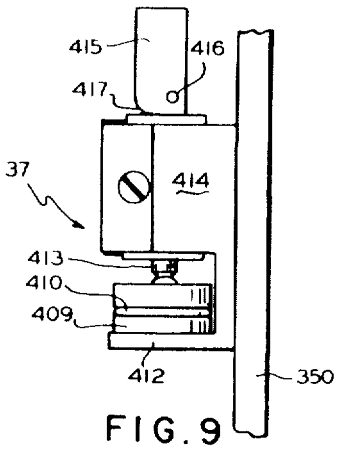
FIG. 9 is a right side elevation of the tape pressure mechanism.

Located between the backspace rollers 36 and capstan 38 is the pressure mechanism, generally designated 37 in FIGS. 2 and 9. This mechanism is mounted on the front of the tape deck wall 350 and is provided to help maintain proper tension on the tape. To this end, the tape passes between a flat cork pad 409 and a flat steel plate 410 which are resiliently biased towards one another. The cork pad is biased upwardly by a spring (not shown) located between the pad an an underlying support shelf 412. The amount of downward pressure exerted by plate 410 can be regulated by means explained just below.

The plate 410 has a ball and socket connection with the lower end of a rod 413 which extends up through the pressure mechanism housing 414 and is connected at its upper end to an operating tab 415. The connection comprises a small pin 416 which passes through the rod normal to its axis so that the tab can be swung forwardly relative to the rod, or in the counter clockwise direction as viewed in FIG. 9. The lower front edge 417 of the tab is formed with a radius which permits such movement, it being possible to move the tab to a position at right angles to the position shown in FIG. 9. Since the pin 416 is located slightly closer to the back than to the front of the tab, movement into its extreme forward or right angle position causes the rod to be raised slightly so that the pressure between pad 409 and plate 410 is reduced. The raising of the rod compresses a spring (not shown) within the housing 414, and this spring urges the rod to return to its lower position as soon as movement of the tab towards its upright position is initiated.

During the normal forward and backward movement of the tape, tab 415 is positioned in its upright position whereby the maximum pressure that is provided for by the mechanism is exerted on the tape. When the tape is being rewound on the reel, however, less pressure is required and the tab is moved to its full forward or right angle position.

From the foregoing description, it will be apparent that the data recorder of the invention provides a novel and highly useful machine that is capable of performing in a versatile yet very efficient manner. As will be understood by those familiar with the art, the invention may be embodied in other specific forms without departing from the spirit or essential characteristics thereof. The embodiment disclosed is, therefore, to be considered in all respects as illustrative rather than restrictive, the scope of the invention being indicated by the appended claims.

What is claimed is:

1. A data recording machine of the character described comprising a tape reel holder, a tension arm having a guide roller over which tape from the reel is passed, a backspace mechanism having a drive roller and an idler roller between which the tape is passed, a variable pressure mechanism through which the tape is passed, an erase head and a read-record head under which the tape is passed, guide rollers for positioning the tape in close engagement with said heads, a drive capstan, a pinch roll mounted adjacent the capstan for movement into and out of engagement therewith, said tape being passed beneath said backspace drive roller and over the top of said capstan, a drive motor, a first drive pulley for said backspace drive roller, a second drive pulley for said capstan, a single timing belt driven by said motor and passing around said first and second drive pulleys, spring means normally holding said pinch roll out of engagement with said capstan, actuator means responsive to a signal from the machine for moving said pinch roll into engagement with the capstan so that the tape is moved in the forward direction, clutch means between said backspace drive drive roller and its drive pulley, said clutch means normally holding said roller disengaged from said pulley, and actuator means responsive to a signal from the machine to engage said roller and pulley long enough to effect one complete revolution of the roller whereby the tape is moved backward a fixed distance.

2. A machine for recording data on tape comprising: a recording head under which the tape is passed, a backspace mechanism having a drive roller adapted to engage the tape, a drive capstan, a pinch roller mounted adjacent the capstan for movement into and out of engagement therewith, said tape being passed partially around said capstan and between said capstan and pinch roller, a drive motor, a first drive pulley for said backspace drive roller, a second drive pulley for said capstan, a single timing belt driven by said motor and passing around said first and second drive pulleys, biasing means normally holding said pinch roller out of engagement with said capstan, selectively operable first actuating means for moving said pinch roller into engagement with the capstan so that the tape is moved in a forward direction, clutch means between said backspace drive roller and its drive pulley, said clutch means normally holding the roller disengaged from said pulley, selectively operable second actuating means for operating said clutch means to engage said backspace drive roller and said second pulley to move the tape backward.

3. The machine as recited in claim 2 wherein said backspace mechanism further comprises an idler roller and the tape passes between said drive roller and said idler roller of said backspace mechanism.

4. The machine as recited in claim 2 wherein said second actuating means engages said backspace drive roller with said second pulley long enough to effect a complete revolution of said backspace drive roller.

* * * * *

PO-1050
(5/69)

UNITED STATES PATENT OFFICE
CERTIFICATE OF CORRECTION

Patent No. 3,666,152 Dated May 30, 1972

Inventor(s) George R. Cogar et al

It is certified that error appears in the above-identified patent and that said Letters Patent are hereby corrected as shown below:

In the Heading and in column 1, line 7:

The filing date of U. S. Patent No. 3,483,523 originally given as "March 30, 1966"

should read "March 3, 1966"

Signed and sealed this 15th day of May 1973.

(SEAL)
Attest:

EDWARD M.FLETCHER,JR.
Attesting Officer

ROBERT GOTTSCHALK
Commissioner of Patents